Figure 1:
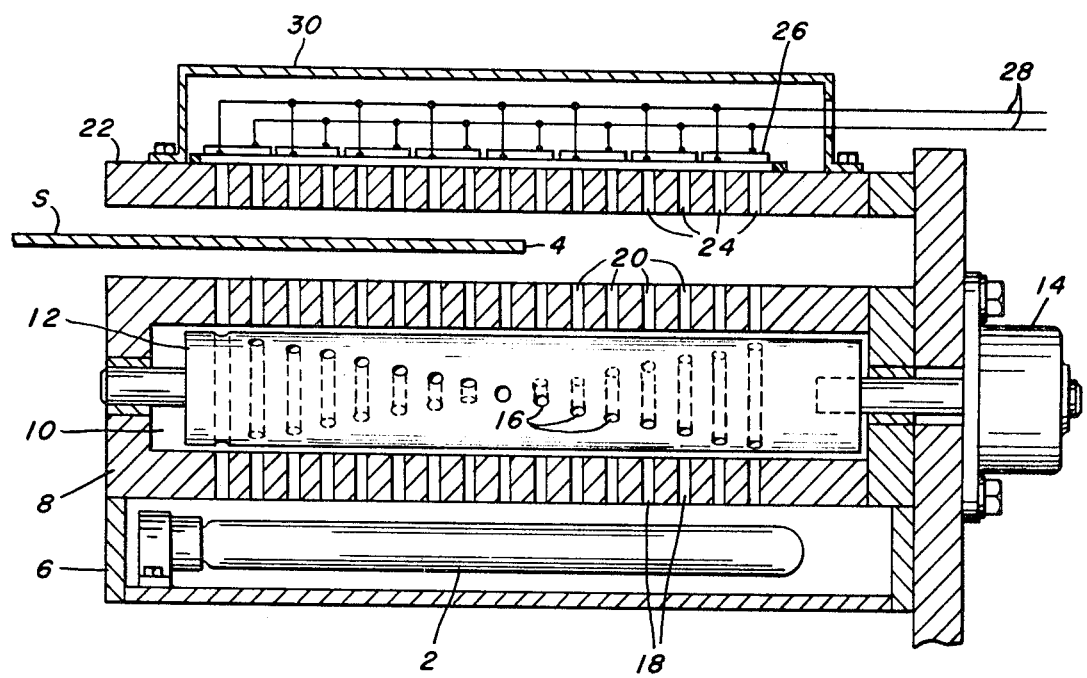

United States Patent

[11] 3,619,626

| [72] | Inventor | Ralph G. Rudolph<br>Edgewood Borough, Pa. |
|---|---|---|
| [21] | Appl. No. | 807,543 |
| [22] | Filed | Mar. 17, 1969 |
| [45] | Patented | Nov. 9, 1971 |
| [73] | Assignee | United States Steel Corporation |

[54] DIGITAL EDGE POSITION DETECTOR
3 Claims, 2 Drawing Figs.

[52] U.S. Cl. ............................................ 250/219WD,
356/160
[51] Int. Cl. ................................................ G01n 21/30
[50] Field of Search ........................................ 250/219
WD, 356/160, 199; 340/347

[56] References Cited
UNITED STATES PATENTS

| 1,859,828 | 6/1932 | Jenkins | |
|---|---|---|---|
| 2,790,088 | 4/1957 | Shive | 250/236 X |
| 3,260,858 | 7/1966 | Kueber | 250/219 IDC |
| 3,312,140 | 4/1967 | Dokoupil | 307/225 X |
| 3,428,817 | 2/1969 | Hofmeister et al. | 250/219 WD |
| 3,474,440 | 10/1969 | Schmid | 250/219 WD<br>340/347 |

FOREIGN PATENTS

| 956,636 | 4/1964 | Great Britain | 250/219 WD |
|---|---|---|---|
| 1,271,997 | 7/1968 | Germany | 356/160 |

OTHER REFERENCES

Braunberger, " Mechanical Scanning Photoresponsive Card Reader," IBM Technical Disclosure Bulletin, Vol. 5, No. 7, Dec., 1962, pp. 105-106; 209/111.7

*Primary Examiner*—James W. Lawrence
*Assistant Examiner*—D. C. Nelms
*Attorney*—Rea C. Helm ABSTRACT: An edge position detector includes a sequencing cylinder positioned on one side of a moving strip. The cylinder is rotated around its longitudinal axis and has a plurality of spaced apart radial holes through it, arranged in a helical pattern. Light from a light source passes through the holes in the cylinder and matching collimating holes. Where the resultant light pulses are not obscured by the strip, they pass through another set of matching collimating holes and impinge upon a photoelectric cell. The light pulses are converted into electrical pulses and counted during a given angular rotation of the cylinder to indicate the position of the edge of the strip as the number of holes beyond the edge of the strip during the counting period.

INVENTOR.
RALPH G. RUDOLPH
By Rea C. Helm
Attorney

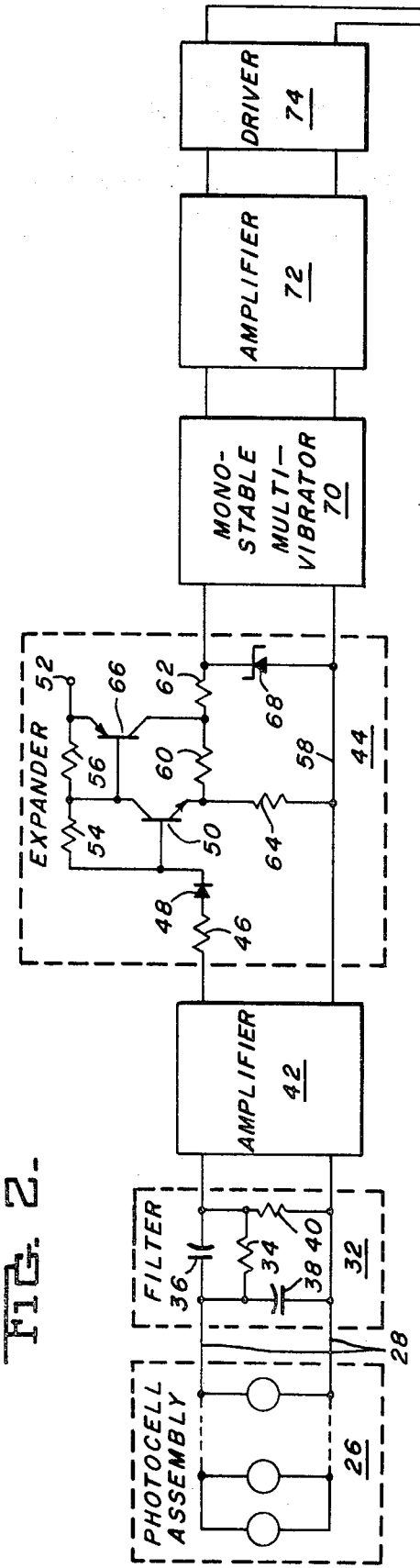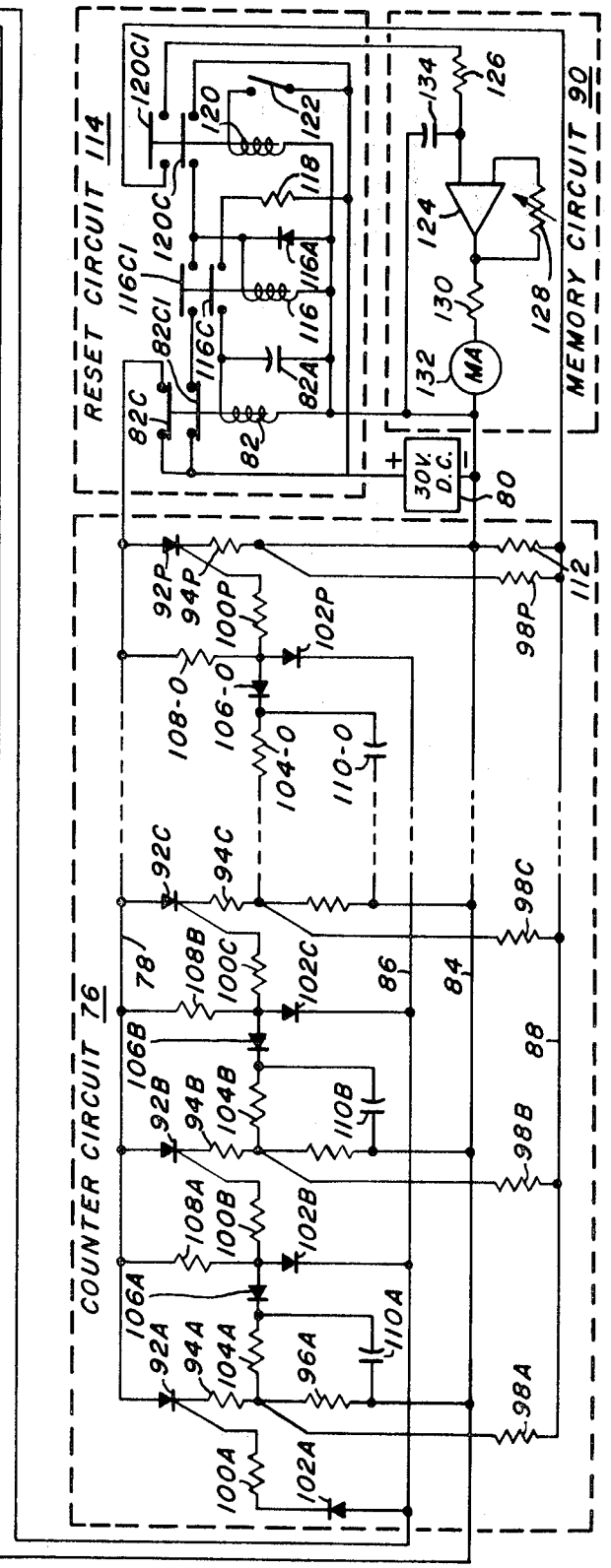

DIGITAL EDGE POSITION DETECTOR

This invention relates to apparatus for determining the position of an edge of strip and, more particularly, to a noncontacting edge position indicator employing collimated pulses of light to determine the edge of a moving slab or strip of material which is opaque to the light used.

In some industrial processes such as steel strip annealing or tinning lines, it is necessary to measure the lateral position of a moving strip to determine if the strip is tracking properly in order to prevent damage to the strip or to surrounding equipment. Edge detectors are commonly used which provide an output to control the strip or supply a position signal. Some processes require that such detector be noncontacting nonpneumatic, employ no magnetic or capacitor elements, withstand large variations in temperature and pressure and be unaffected by vapors or materials that cloud optical devices.

Analog optical edge detectors, in which the edge of the material to be measured extends into the path of light and edge position is detected by varying the amount of light arriving at a receiver, meet many of these requirements but have several disadvantages. A second photo cell may be required to monitor the source of light intensity to compensate for fluctuating light density. Effects of external light must be minimized by shielding, using high intensity light, special wave bands or special frequencies. Effects of temperature and aging on photo cells must be considered.

It is, therefore, an object of my invention to provide an optical edge position detector using a minimum of light shielding and a simple light source.

Another object of my invention is to provide an optical edge position detector that is generally insensitive to aging of components and to the vapors that may affect light intensity.

Still another object of my invention is to provide an optical edge position detector that requires no thermal compensation.

These and other objects will be more apparent after referring to the following specification and attached drawings in which:

FIG. 1 is a sectional view of the light pulse generating apparatus of my invention, and FIG. 2 is a schematic diagram of the pulse shaping and counter circuits of my invention.

Referring now to the drawings, reference character S refers to a strip moving in a process line (not shown). A source of light 2 is located on one side of the strip S at a location where it is desired to determine the lateral position of the strip edge 4. Light source 2, which may be a conventional long filament light bulb, is enclosed in a box 6. Mounted on top of box 6 is a collimating block 8 with an axial opening 10 through its center. Closely fitted inside aperture 10 is a sequencing cylinder 12 which is rotated by a motor 14. Cylinder 12 has a set of uniformly spaced apart radial holes 16 therethrough arranged in a helical pattern with an angular spacing of 10°. Collimating block 8 has a first set of holes 18 between sequencing cylinder 12 and light source 2 and a second set of holes 20 between the sequencing cylinder 12 and one side of the strip S. On the other side of strip S is a collimating bar 22 which has a set of holes 24. There are sixteen holes in each of the four sets with corresponding holes in the sets having their axes in a common plane and the holes 18, 20 and 24 are axially aligned so that light from source 2 may impinge sequentially on a photo cell assembly 26 as the sequencing cylinder 12 is rotated. Photo cell assembly 26 has eight conventional silicon photo voltaic cells, each cell covering a pair of adjacent holes 24. Electrical outputs 28 of the cells are connected in parallel. A light tight cover 30 protects the photo cells and collimating bar.

Output 28 of photo cell assembly 26 is connected to a filter 32. Filter 32 has a resistor 34 and a capacitor 36 connected in parallel with each other through the filter, a capacitor 38 connected across the filter input and a resistor 40 connected across the filter output. Filter 32 is connected to an amplifier 42 which may be a Model P-45 manufactured by Philbrick Research, Inc. Amplifier 42 is connected to an expander circuit 44.

One side of the input of expander circuit 44 includes a resistor 46 and a diode 48 connected in series to a base of an NPN transistor 50 and to a +15 volt DC supply 52 through resistors 54 and 56, connected in series. The other side 58 of the input to expander 44 is connected to its output. A collector of transistor 50 is connected to supply 52 through resistor 56. An emitter of transistor 50 is connected to one side of the output of expander circuit 44 through resistors 60 and 62 connected in series and to the other side 58 of expander 44 output through a resistor 64. A PNP transistor 66 has a base connected to the collector of transistor 50, an emitter connected to supply 52 and a collector connected to the junction of resistors 60 and 62. A zener diode 68 is connected across the output of expander 44.

The output of expander 44 is connected to a monostable multivibrator 70 which may be a Model T-166 manufactured by the Engineered Electronics Company, Santa Ana, California. The output of multivibrator 70 is connected to an amplifier 72 which may be a Model P-5 manufactured by Philbrick Research, Inc. The output of amplifier 72 is connected to a relay driver 74 which may be a Model T-120 manufactured by Engineered Electronics Company, Santa Ana, California. The output of relay driver 74 is connected to a counter circuit 76.

Counter circuit 76 has a positive line 78 connected to the positive side of a 30 volt DC power source 80 through normally closed contacts 82C of relay 82, a negative line 84 connected to the output of driver 74 and the negative side of source 80, a pulse line 86 connected to the output of driver 74 and a summing line 88 connected to a memory circuit 90. Connected across lines 78, 84, 86 and 88 are 16 counter sections. A first counter section, shown by reference numerals having a suffix "A," has a silicon controlled rectifier 92A with an anode connected to line 78, a cathode connected to line 84 through resistors 94A and 96A connected in series and to line 88 through resistors 94A and 98A connected in series. A gate of rectifier 92A is connected to line 86 through a resistor 100A and a diode 102A connected in series, with an anode of diode 102A connected to line 86. A charging circuit consists of a resistance 104A, a diode 106A and a resistance 108A connected in series between line 78 and the junction of resistors 94A and 96A, and a capacitor 110A connected between line 84 and the junction of resistor 104A and diode 106A.

The second counter section, designated by suffix "B" is the same as the first counter section except diode 102B has its cathode connected to line 86. The junction of diode 106A and resistor 108A is connected to the junction of resistor 100B and diode 102B. The remaining sections of the counter circuit have the same components connected in the same manner except the last section, designated by a suffix "P", has no charging circuit. A summing resistor 112 is connected across lines 84 and 88.

Reset circuit 114 has a relay coil 82 connected to the negative side of power source 80 and the positive side of power source 80 through normally open contacts 116C of relay 116 and a resistor 118. A capacitor 82A is connected across relay coil 82. Relay coil 116 is connected to the negative side of source 80 and to the positive side of source 80 through the parallel combination of normally open contacts 120C of a relay 120 with normally open contacts 116C1 of relay 116 in series with normally closed contacts 82C1 of relay 82. A diode 116A is connected across relay coil 116. A relay coil 120 is connected to the negative side of power source 80 and to the positive side of power source 80 through a switch 122 mounted on the shaft of motor 14 and timed to close for the next 10° of motor shaft rotation after the sixteenth hole in sequencing cylinder 12 has been in position to pass light to the photo cells. Switch 122 will close twice for each revolution of the shaft of motor 14.

Memory circuit 90 connects line 88 to an input of an amplifier 124 through normally open contacts 120C1 of relay 120 and a resistor 126 connected in series. The amplifier may be a Model P-2 operational amplifier, chopper stabilized, manufactured by Philbrick Research, Inc. A variable resistor 128 is connected across amplifier 124. An output of amplifier 124 is connected to line 84 through a resistor 130 and a milliammeter 132 connected in series. A capacitor 134 is connected between line 84 and the input to amplifier 124.

After positioning in relation to the strip S, the edge position detector is placed in operation by energizing motor 14 and light source 2. As sequencing cylinder 12 rotates, the holes 16 become aligned sequentially with the holes 18, 20 and 24 passing light pulses to the photo cell assembly 26 where strip S does not obstruct the light. Thus the number of light pulses received by the photo cells for each half revolution of cylinder 12 is a measure of the strip location. The electrical pulses developed by photo cell assembly 26 pass through filter 32 and amplifier 42 which removes extraneous noise by filtering out frequencies over about 500 cycles per second (with cylinder 12 rotating at 100 revolutions per minute) and minimizes the effect of ambient light by providing a low DC gain and a high AC gain above about 10 cycles per second. Expander 44 is a conventional expander circuit to shape the pulses to trigger monostable multivibrator 70. The usable signal level input to expander 44 of about 1 volt is expanded to about 6 volts eliminating signals below about 0.2 volts. The output signal of multivibrator 70 is amplified by amplifier 72 adequate to operate relay driver 74. Relay driver 74 passes pulses from multivibrator 70 to lines 84 and 86 and connects line 84 to line 86 between pulses.

Assuming the counter is in a condition to receive pulses, the first pulse received passes through diode 102A and resistance 100A to turn on SCR 92A. Current then flows from source 80 through contacts 82C, line 78, SCR 92A, resistors 94A and 96A and line 84 back to source 80. Part of the current through SCR 92A and resistor 94A also flows through resistor 98A, line 88 and summing resistor 112 to source 80 and another part of the current through SCR 92A also flows through resistor 104A to charge capacitor 110A. Before the arrival of the second pulse, the junction of diode 106A and resistor 108A becomes essentially at ground potential and the junction of diode 106A and resistor 104A assumes a positive voltage by the charging of condenser 110A. When the second pulse arrives, the relay driver removes line 86 from ground potential and the positive voltage developed at the junction of diode 106A and resistor 104A is applied through resistor 100B to the gate of SCR 92B. SCR 92B then turns on and adds to the current flowing through line 88 in the same manner as the first counter section. Each subsequent SCR 92 is turned on to add to the current flowing through the summing resistance 112 with each additional pulse. At the end of a half revolution of cylinder 12 there exists a current flowing through the summing resistor 112 which is a function of the number of pulses received by counter circuit 76 or the spacing of the strip with respect to the holes in cylinder 12.

When the last hole of the holes in sequencing cylinder 12 has been aligned to pass a train of light pulses, switch 122 closes. This activates relay 120, closing contact 120C1. Closing of contact 120C1 transfers the voltage across summing resistor 112 to capacitor 134. The voltage is applied to amplifier 124 and the output of amplifier 124 is shown through milliammeter 132. Meter 132 may be calibrated in units descriptive of the edge position in a particular installation or the voltage may be used as an analog signal to actuate a tracking mechanism such as a guide roll.

When contact 120C closes, relay 116 is energized closing contacts 116C1 which latches relay 116 ON through contact 82C1. Switch 122 then opens, opening contacts 120C. After a delay period, determined by capacitor 82A and resistor 118, relay coil 82 is energized, opening contacts 82C which resets all the SCRs with reference numeral 92, and discharges all capacitors with reference numeral 110. Contact 82C1 is also opened which deenergizes coil 116 but the opening of contacts 116C and 116C1 is delayed because of the inductive current in coil 116 through diode 116A. When the inductive current has decayed to a low enough value, relay coils 116 and 82 are deenergized and the counter is ready to receive the next series of pulses.

In the present embodiment of my invention, 16 holes are spaced 10° apart on cylinder 12. Switch 122 is closed for the next 10° of rotation and the reset circuit has completed its function within the following 10° of rotation. The analog voltage signal or the output as shown on meter 132 is maintained until the next time switch 122 is closed.

While one embodiment of my invention has been shown and described, it will be apparent that other adaptations and modifications may be made.

I claim:

1. Apparatus for detecting the position of the edge of a moving strip comprising a light source located on one side of the strip, a collimating block between the light source and said one side of the strip, a first and a second set of parallel matching spaced apart holes in said block with matching holes in axial alignment and located along a line transverse to the direction of travel of the strip, a rotatable cylinder, means for rotating said cylinder, an axial opening in said block between said first and second sets of holes adapted to receive said cylinder, a third set of spaced apart radial holes, each angularly displaced from each other in said cylinder and arranged so that when the cylinder is rotated, light may pass from said source through said first set of holes, through said third set of holes one at a time and then through said second set of holes thereby providing repetitive groups of spaced apart light pulses as said cylinder rotates, means on the other side of said strip for receiving those light pulses which pass beyond the edge of the strip, means connected to said receiving means for converting said received light pulses into electrical pulses, and means connected to said converting means and said means for rotating said cylinder for counting said electrical pulses resulting from each group of light pulses.

2. Apparatus according to claim 1 in which said means for receiving light pulses includes a collimating bar located on the side of the strip opposite said light source, a fourth set of spaced apart holes in said collimating bar in axial alignment with the holes in the first and second sets, and photo electric cell means along the edge of the collimating bar away from the strip for receiving light pulses through the sets of holes and developing corresponding electrical signals.

3. Apparatus according to claim 2 in which said converting means comprises filter means connected to said photo cell means for filtering said electrical signals to remove certain high frequencies and certain low frequencies, an amplifier connected to said filter means, signal expander means connected to said amplifier for removing that portion of said electrical signals below a predetermined amplitude and for amplifying that portion of the electrical signals above said predetermined amplitude and for limiting the amplitude of said electrical signals, and pulse shaping means connected to said limiting means for developing an output of uniform amplitude and time duration.

* * * * *